US010967763B2

(12) United States Patent
Evans

(10) Patent No.: US 10,967,763 B2
(45) Date of Patent: Apr. 6, 2021

(54) REMOVABLE AND CONVERTIBLE SEAT ASSEMBLY

(71) Applicant: Pratt & Miller Engineering and Fabrication, Inc., New Hudson, MI (US)

(72) Inventor: Celyn M. Evans, Berkley, MI (US)

(73) Assignee: PRATT & MILLER ENGINEERING AND FABRICATION, INC., New Hudson, MI (US)

( * ) Notice: Subject to any disclaimer, the term of this patent is extended or adjusted under 35 U.S.C. 154(b) by 0 days.

(21) Appl. No.: 16/360,074

(22) Filed: Mar. 21, 2019

(65) Prior Publication Data

US 2020/0298735 A1   Sep. 24, 2020

(51) Int. Cl.
*A61G 1/017* (2006.01)
*B60N 2/34* (2006.01)
*B60N 2/235* (2006.01)
*F41H 7/04* (2006.01)
*A61G 5/00* (2006.01)

(52) U.S. Cl.
CPC ............... *B60N 2/34* (2013.01); *A61G 1/017* (2013.01); *B60N 2/2362* (2015.04); *A61G 5/006* (2013.01); *F41H 7/046* (2013.01)

(58) Field of Classification Search
CPC . B60N 2/34; B60N 2/36; B60N 2/366; B60N 2/38; B60N 2002/363; B60N 2/2362; A61G 1/017; A61G 7/16; A61G 5/006; F41H 7/046
USPC ........................................................ 297/63
See application file for complete search history.

(56) References Cited

U.S. PATENT DOCUMENTS

| 1,975,689 | A | * | 10/1934 | Hall ......................... | A47C 4/40 297/18 |
| 2,375,151 | A | * | 5/1945 | Troxell .................. | A61G 5/006 297/83 |
| 2,609,862 | A | * | 9/1952 | Pratt ...................... | A61G 5/006 297/344.19 |
| 2,682,913 | A | * | 7/1954 | Manternach .......... | A61G 5/006 297/87 |
| 2,745,114 | A | | 5/1956 | Cote | |

(Continued)

FOREIGN PATENT DOCUMENTS

CN          1401303 A       3/2003

OTHER PUBLICATIONS

International Search Report and Written Opinion of PCT/US2020/023275 dated Jun. 17, 2020.

*Primary Examiner* — Kyle J. Walraed-Sullivan
(74) *Attorney, Agent, or Firm* — Dickinson Wright PLLC

(57) ABSTRACT

A removable and/or mountable seat assembly includes a seat back and a seat pan that are pivotally connected to each other via a locking device and rotate about at least one common axis of rotation. The locking device is in mechanical communication with the seat back and the seat pan and is configured to lock the seat back and the seat pan relative to each other about the at least one common axis of rotation. The locking device is configured to selectively lock the seat pan and the seat back such that the seat back and the seat pan lie along the common plane forming the stretcher or selectively lock the seat pan and the seat back such that the seat back and the seat pan form a seat. Additionally, the seat back and the seat pan may be locked in yet another position allowing for the easy transport and/or storage of the seat assembly.

21 Claims, 10 Drawing Sheets

(56) References Cited

U.S. PATENT DOCUMENTS

| | | | | |
|---|---|---|---|---|
| 2,784,766 A * | 3/1957 | Hale | | A47C 17/161 |
| | | | | 297/114 |
| 2,828,808 A * | 4/1958 | Hilton | | A47C 4/52 |
| | | | | 297/112 |
| 2,869,614 A * | 1/1959 | Wamsley | | A61G 5/006 |
| | | | | 280/230 |
| 3,137,511 A * | 6/1964 | Weil | | A61G 5/0858 |
| | | | | 280/5.24 |
| 3,179,465 A * | 4/1965 | Roberts | | A47C 4/52 |
| | | | | 297/17 |
| 3,271,796 A * | 9/1966 | Dillman | | A47C 7/425 |
| | | | | 5/625 |
| 3,282,625 A * | 11/1966 | Logan | | B60N 2/34 |
| | | | | 297/65 |
| 3,309,134 A * | 3/1967 | Roberts | | A47C 4/52 |
| | | | | 297/17 |
| 3,380,085 A | 4/1968 | Ferneau et al. | | |
| 3,504,940 A * | 4/1970 | Friese | | A47C 17/2076 |
| | | | | 297/105 |
| 3,921,231 A | 11/1975 | Bourgraf et al. | | |
| 4,186,960 A * | 2/1980 | Mizelle | | B60N 2/34 |
| | | | | 248/430 |
| 4,193,147 A * | 3/1980 | Fischer | | A61G 5/006 |
| | | | | 5/87.1 |
| 4,543,675 A * | 10/1985 | Shrock | | A47C 17/161 |
| | | | | 5/18.1 |
| 4,620,335 A * | 11/1986 | Dodgen | | B60N 2/34 |
| | | | | 296/69 |
| 4,625,346 A * | 12/1986 | Quackenbush | | A47C 17/161 |
| | | | | 297/342 |
| 4,688,279 A * | 8/1987 | Vance | | A61G 1/0212 |
| | | | | 296/20 |
| 4,754,987 A * | 7/1988 | Williams | | A61G 5/00 |
| | | | | 280/304.1 |
| 4,858,260 A * | 8/1989 | Failor | | A61G 5/006 |
| | | | | 5/618 |
| 5,161,275 A * | 11/1992 | Simpson | | A61G 1/017 |
| | | | | 297/219.1 |
| 5,375,277 A * | 12/1994 | Carr | | A61G 1/017 |
| | | | | 280/47.25 |
| 5,380,034 A * | 1/1995 | Wilson | | A61G 5/006 |
| | | | | 280/30 |
| 5,496,092 A * | 3/1996 | Williams | | A61F 5/3792 |
| | | | | 297/250.1 |
| 5,572,756 A * | 11/1996 | Muuranen | | A61G 1/017 |
| | | | | 296/20 |
| 6,015,186 A * | 1/2000 | Grieger | | B60N 2/30 |
| | | | | 296/69 |
| 6,173,461 B1 * | 1/2001 | Alexander | | A61G 5/006 |
| | | | | 5/613 |
| 6,295,668 B1 * | 10/2001 | Nation | | A47C 1/143 |
| | | | | 5/110 |
| 6,848,127 B2 * | 2/2005 | Inagaki | | A47C 17/1655 |
| | | | | 5/12.1 |
| 7,131,151 B2 | 11/2006 | Ferneau et al. | | |
| 7,302,718 B2 | 12/2007 | Ferneau et al. | | |
| 7,959,222 B1 * | 6/2011 | Powell | | A47C 20/026 |
| | | | | 297/188.06 |
| 8,104,121 B2 | 1/2012 | Bourgraf et al. | | |
| 8,276,984 B1 * | 10/2012 | Jamison, Jr. | | A47C 17/14 |
| | | | | 297/126 |
| 8,567,866 B2 | 10/2013 | Carimati | | |
| 8,602,475 B2 | 12/2013 | Fletcher et al. | | |
| 8,708,406 B1 * | 4/2014 | Powell | | A47C 21/00 |
| | | | | 297/188.06 |
| 8,745,791 B1 * | 6/2014 | Ullrich | | A61G 1/017 |
| | | | | 5/626 |
| 9,909,845 B2 | 3/2018 | Lee et al. | | |
| 10,596,927 B2 * | 3/2020 | Herrera Barrera | | B60N 2/3011 |
| 2004/0205895 A1 * | 10/2004 | Ito | | A61G 7/0513 |
| | | | | 5/618 |
| 2005/0241063 A1 | 11/2005 | Ferneau et al. | | |
| 2006/0186717 A1 * | 8/2006 | Barackman | | A47C 7/14 |
| | | | | 297/284.1 |
| 2006/0243126 A1 * | 11/2006 | Tyler | | F41H 7/00 |
| | | | | 89/36.01 |
| 2007/0056104 A1 | 3/2007 | Ferneau et al. | | |
| 2007/0057542 A1 * | 3/2007 | Rush | | A61G 5/00 |
| | | | | 297/219.1 |
| 2007/0174967 A1 | 8/2007 | Bourgraf | | |
| 2008/0000028 A1 * | 1/2008 | Lemire | | A61G 7/053 |
| | | | | 5/618 |
| 2008/0132383 A1 * | 6/2008 | Einav | | A61H 3/008 |
| | | | | 482/8 |
| 2010/0005592 A1 * | 1/2010 | Poulos | | A61G 7/16 |
| | | | | 5/618 |
| 2011/0138536 A1 * | 6/2011 | Wernqvist | | A61G 7/002 |
| | | | | 5/618 |
| 2011/0272200 A1 * | 11/2011 | Clapp | | A61G 1/02 |
| | | | | 180/54.1 |
| 2012/0117732 A1 * | 5/2012 | O'Keefe | | A61G 7/0506 |
| | | | | 5/613 |
| 2012/0205934 A1 | 8/2012 | Fletcher et al. | | |
| 2012/0286544 A1 * | 11/2012 | Cohen | | A47C 4/46 |
| | | | | 297/30 |
| 2013/0333115 A1 * | 12/2013 | Reinke | | A61G 7/002 |
| | | | | 5/614 |
| 2014/0157515 A1 * | 6/2014 | Manson | | A61G 5/006 |
| | | | | 5/13 |
| 2014/0300154 A1 * | 10/2014 | Pfister | | B60N 2/32 |
| | | | | 297/250.1 |
| 2015/0052682 A1 * | 2/2015 | Biswell | | A61G 1/013 |
| | | | | 5/627 |
| 2015/0173983 A1 * | 6/2015 | Bourgraf | | B60N 2/995 |
| | | | | 296/19 |
| 2015/0216749 A1 * | 8/2015 | Heil | | A61G 7/0514 |
| | | | | 5/617 |
| 2015/0290061 A1 * | 10/2015 | Stafford | | A63B 22/0089 |
| | | | | 5/600 |
| 2016/0128880 A1 * | 5/2016 | Blickensderfer | | A61G 1/04 |
| | | | | 296/20 |
| 2016/0242548 A1 * | 8/2016 | Barnum | | A47C 7/72 |
| 2016/0262546 A1 * | 9/2016 | Cassaday | | A47C 17/213 |
| 2016/0313094 A1 | 10/2016 | Lee et al. | | |
| 2016/0367414 A1 * | 12/2016 | Krolick | | A61G 1/017 |
| 2017/0065474 A1 * | 3/2017 | Trepanier | | A61G 1/02 |
| 2017/0326007 A1 * | 11/2017 | Hiemenz | | B60N 2/60 |
| 2018/0028383 A1 | 2/2018 | Stryker et al. | | |
| 2018/0334061 A1 * | 11/2018 | Fredriksson | | B60N 2/865 |
| 2019/0054846 A1 * | 2/2019 | Gibbons | | B60N 2/809 |
| 2019/0083338 A1 * | 3/2019 | Childs | | A61G 7/16 |
| 2019/0106022 A1 * | 4/2019 | Herrera Barrera | | B60N 2/12 |
| 2020/0010199 A1 * | 1/2020 | Ferguson | | B60N 2/891 |
| 2020/0079263 A1 * | 3/2020 | Suarez | | B60N 2/829 |
| 2020/0146912 A1 * | 5/2020 | Gillespie | | A61G 1/003 |
| 2020/0179199 A1 * | 6/2020 | Feliksa | | A61G 7/0506 |
| 2020/0188199 A1 * | 6/2020 | Smink | | A61G 5/128 |

* cited by examiner

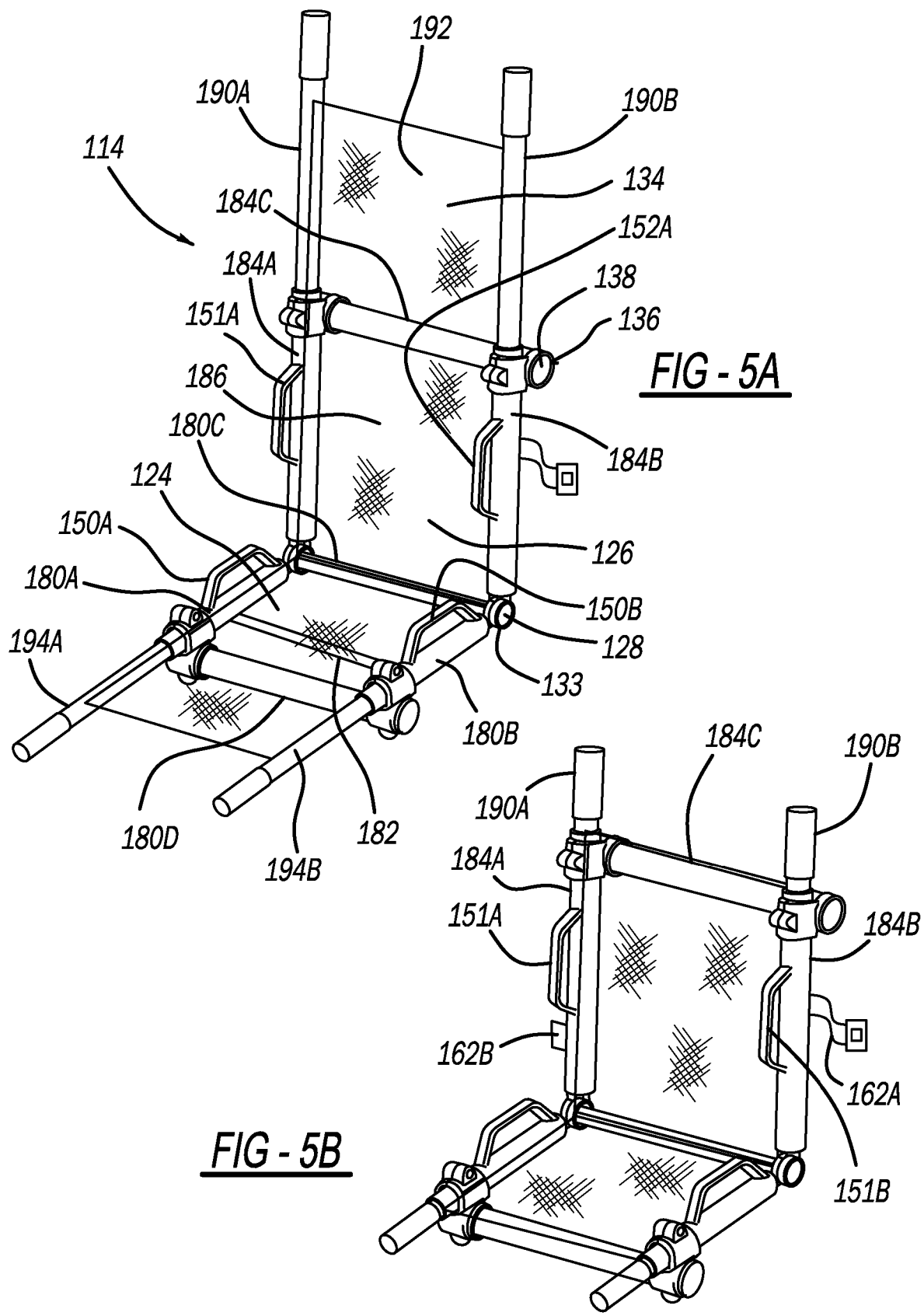

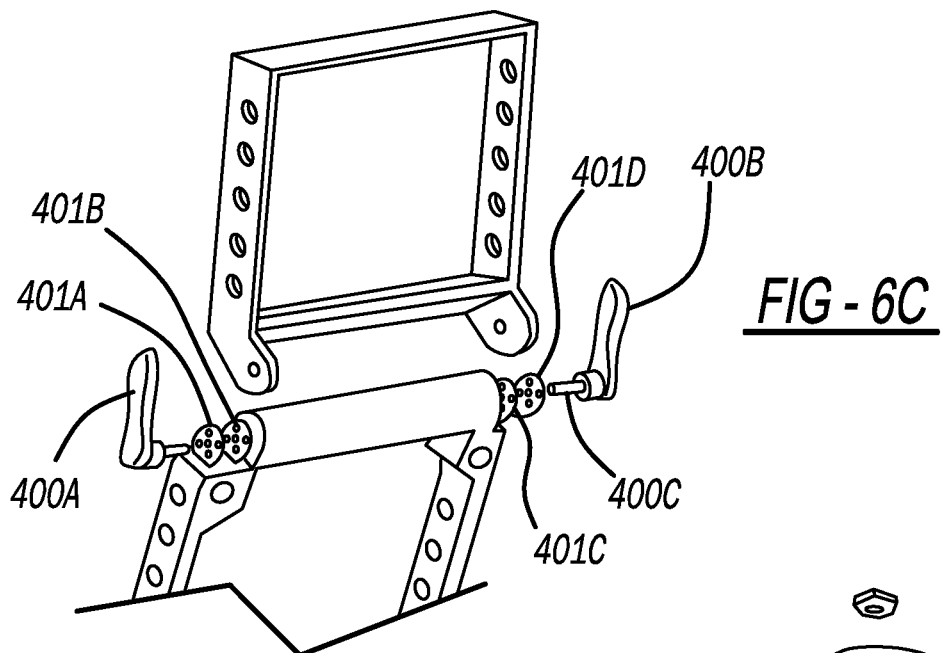
*FIG - 6C*
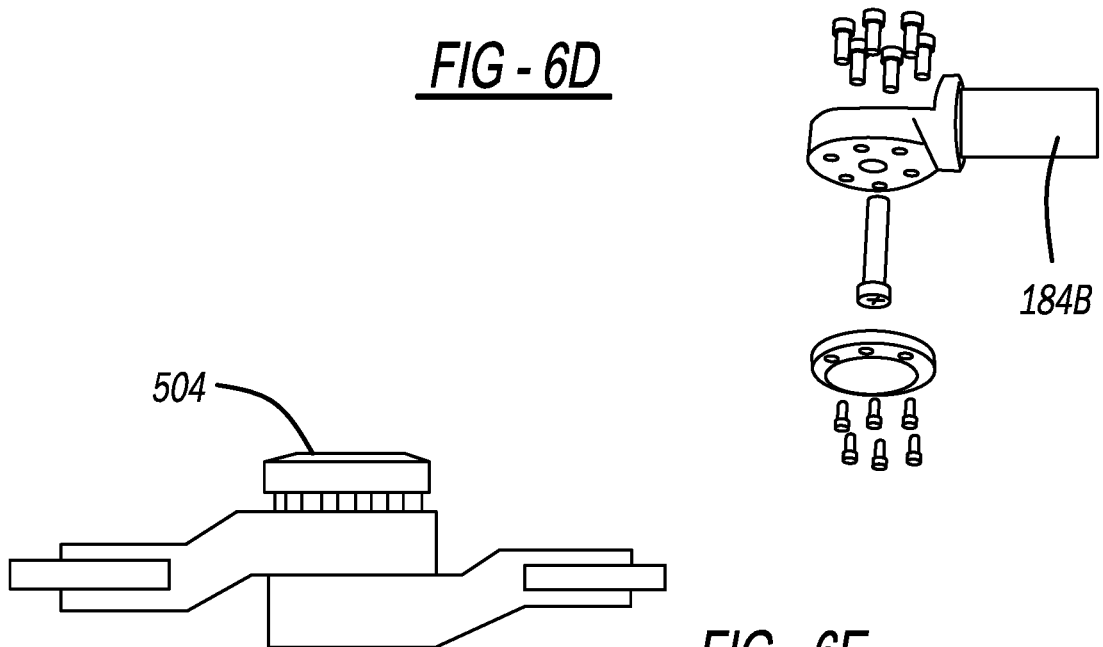
*FIG - 6D*
*FIG - 6E*

REMOVABLE AND CONVERTIBLE SEAT ASSEMBLY

BACKGROUND

1. Field of the Invention

This disclosure relates to a removable and/or mountable seat assembly that can convert from a seat into a stretcher.

2. Description of Related Art

Seat assemblies have been utilized in vehicles for this transportation of persons from one location to another. The seat assemblies are generally fixed into place. In certain situations, such as minivans, the seat assemblies may be capable of being folded up and removed from the vehicle so as to allow more space for the transportation of cargo.

For military vehicles, seating assemblies are also generally fixed into place and may have certain blast mitigating properties. So, for example, the seating assembly in a military vehicle may be attached to an energy attenuating device that is capable of absorbing some of the shock from an external event, such as an explosion outside the vehicle.

However, in the event that a military vehicle experiences a violent external event or a civilian vehicle is in an accident, the seat assemblies generally do not allow for the safe removal of a person that is located within the seat assembly from the vehicle, nor do they allow for the transportation of a person to a safe location, such as a hospital, without first removing the person from the seat assembly.

SUMMARY

A removable and/or mountable seat assembly includes a seat back and a seat pan that are pivotally connected to each other and rotate about a common axis of rotation. A locking device is in mechanical communication with the seat back and the seat pan and is configured to lock the seat back and the seat pan relative to each other about the at least one common axis of rotation. The locking device is configured to selectively lock the seat pan and the seat back such that the seat back and the seat pan lie along the common plane forming a stretcher or selectively lock the seat pan and the seat back such that the seat back and the seat pan form a seat. Additionally, the seat back and the seat pan may be locked in yet another position allowing for the easy transport and/or storage of the seat assembly.

Further objects, features, and advantages of this invention will become readily apparent to persons skilled in the art after a review of the following description, with reference to the drawings and claims that are appended to and form a part of this specification.

BRIEF DESCRIPTION OF THE DRAWINGS

FIGS. 5A, 5B, 5C, and 5D illustrate a more detailed view of another example of the seat assembly; and FIGS. 6A-6F illustrate different examples of a locking device for the seat assembly.

DETAILED DESCRIPTION

Figure 1:
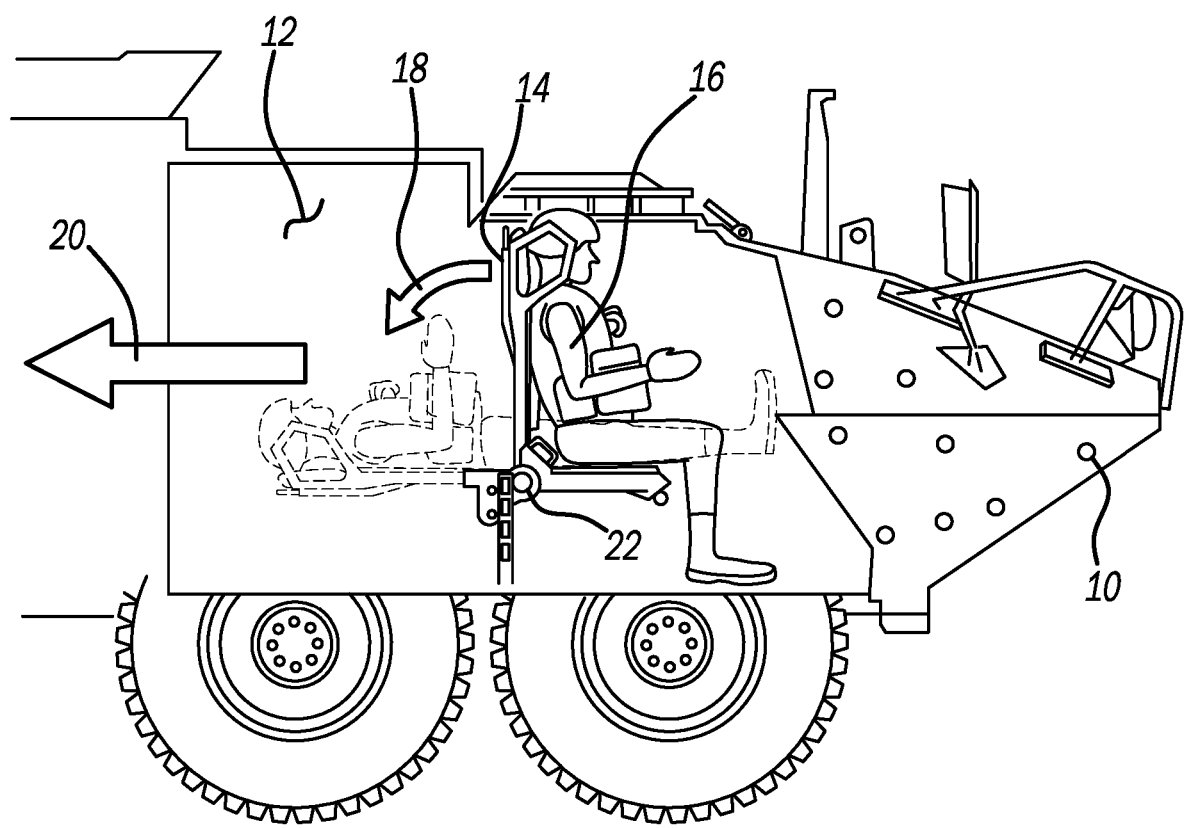
FIG. 1 illustrates a seat assembly located within an interior of a vehicle.

Referring to FIG. 1, an interior 12 of a vehicle is shown. A seat assembly 14 is disposed within the interior 12 of the vehicle 10. As will be better described later in this disclosure, the seat assembly 14 has the ability to function as a seat for a person 16 in a first mode but also has the ability to lay flat and form a stretcher in a second mode as indicated by arrow 18. By so doing, the person 16 located within the seat assembly 14 can be laid flat and removed as indicated by arrow 20, along with the seat assembly 14, safely from the vehicle 10 in the case of an injury to the person 16. The seat assembly 14 can then be later mounted back within the interior 12 of the vehicle 10 at another time.

It should be understood that the seat assembly 14 can be utilized in any one of a number of different environments. As shown in FIG. 1, the seat assembly 14 is located within a military vehicle 10. However, the seat assembly 14 may be utilized in any one of a number of different vehicles, such as civilian vehicles, aircraft, boats, manufacturing vehicles, agricultural vehicles, and the like.

Additionally, it should be further understood that the seat assembly 14 can be utilized without any vehicle at all. As will be described later in this disclosure, the seat assembly 14 is removable from any type of support structure, which could include a wall, an energy absorbing device, or any structure capable of supporting the seat. Also, it should be understood that the seat assembly 14, because it can be removable from any type of support structure, can also be mountable/re-mountable to any type of support structure.

Still referring to FIG. 1, in this example, the seat assembly 14 is removably attached to an energy attenuating device 22. The energy attenuating device 22 may be a rotary energy absorbing device, such as shown and described in U.S. patent application Ser. No. 16/251,518, which is hereby incorporated by reference in its entirety.

Figure 2A:
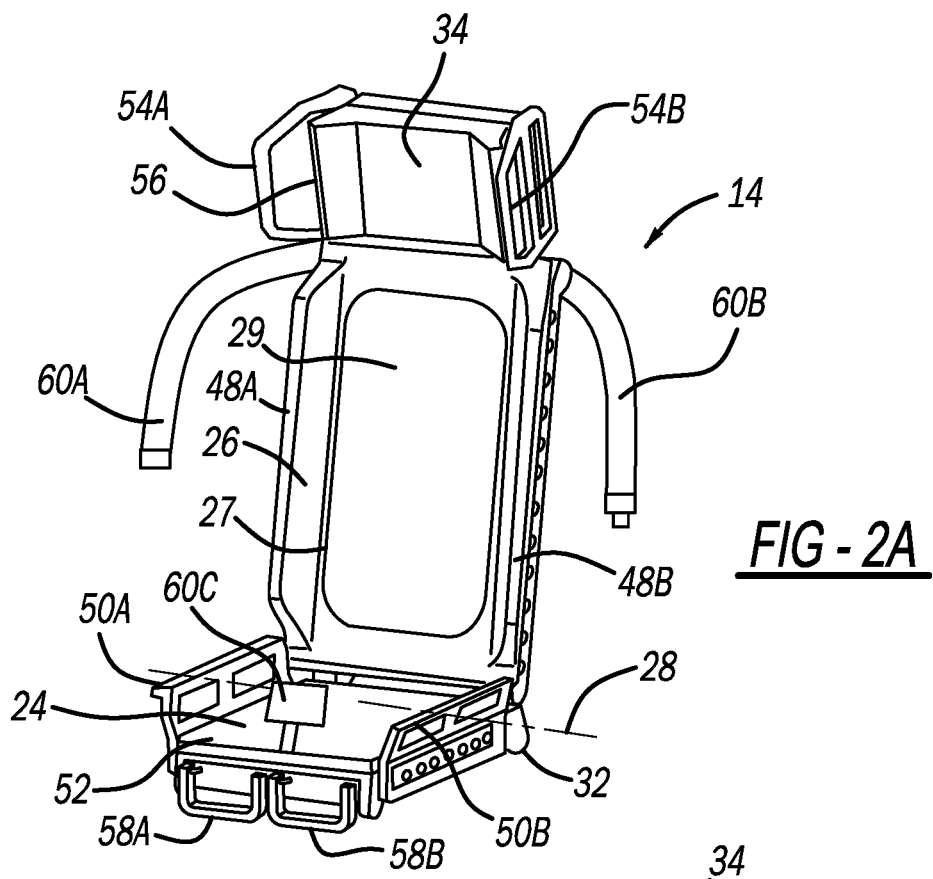
FIGS. 2A, 2B, 2C, and 2D illustrate a more detailed view of one example of the seat assembly.
Figure 2B:
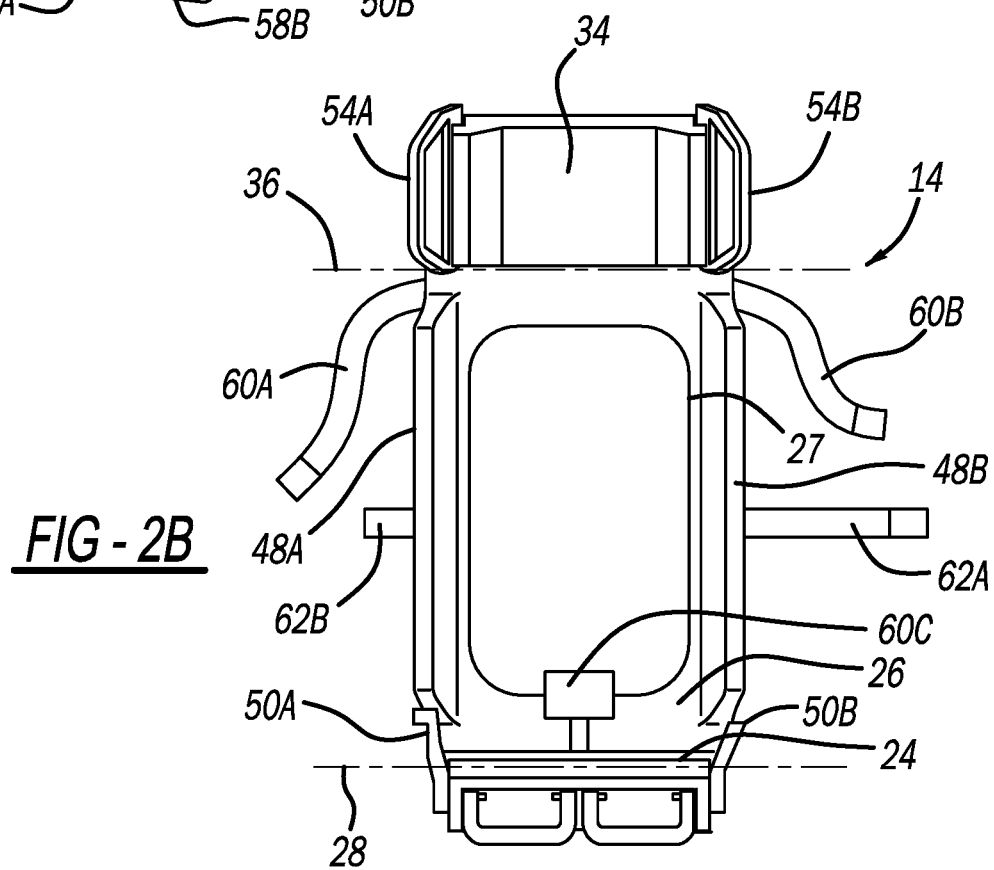
Figure 2C:
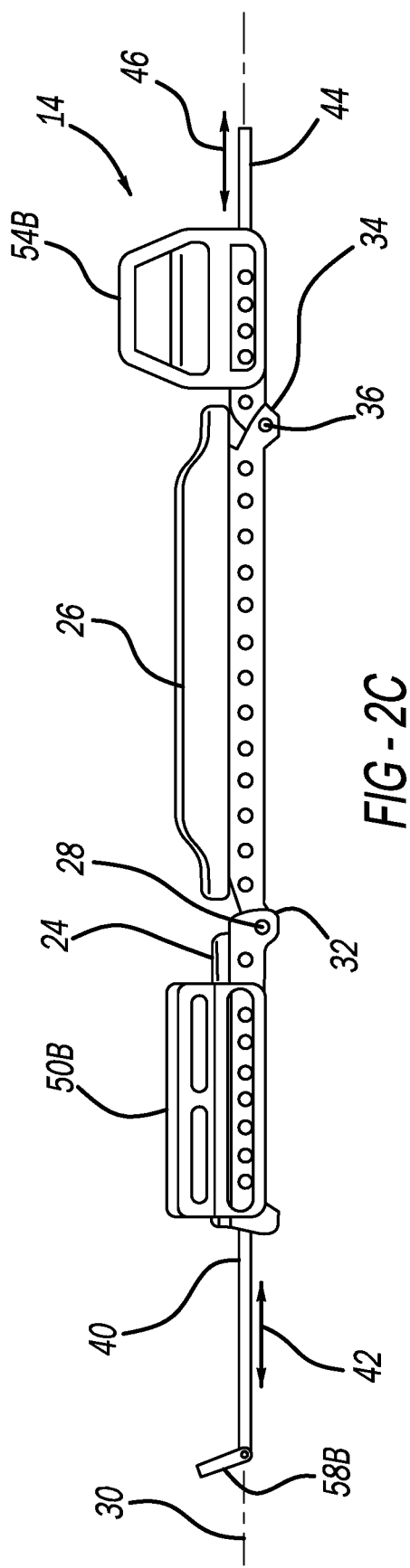

Referring to FIGS. 2A, 2B, and 2C, one example of the seat assembly 14 is shown. Here, the seat assembly 14 includes a seat pan 24 that is rotatably attached to a seat back 26 along a central pivot 28 having an axis. As such, the seat back 26 can rotate with respect to the seat pan 24 along the central pivot 28. As best shown in FIG. 2C, in this example, the seat pan 24 and seat back 26 are generally folded flat along a plane 30, approximately 180° relative to each other. When the seat pan 24 and the seat back 26 are arranged in this type of configuration, the seat assembly 14 can essentially act as a stretcher allowing a person to be laid out flat and transported to another location, such as a hospital. In this example, the seat pan 24 and/or the seat back 26 may be a molded structure.

The seat assembly 14 also includes a locking device 32 that allows the rotation of the seat pan 24 in relation to the seat back 26 when in an unlocked mode but prevents and therefore locks the position of the seat pan and the seat back 26 when in a locked mode. In one example, the seat assembly 14 may have at least two different configurations. As best shown in FIG. 2A, the seat assembly 14 may be such that the seat pan 24 and the seat back 26 are arranged at an angle between each other and locked into place by the locking device 32. This angle can vary and generally in any angle other than 180 degrees (i.e. the flat stretcher position) For example, the angle between the seat back 26 and the seat pan 24 may be between 8° and 130° so as to allow a person to comfortably sit within the seat assembly 14.

As best shown in FIG. 2C, the seat assembly 14 may be configured such that the seat pan 24 and the seat back 26 are essentially in line with one another gently along the plane 30. The locking device 32 may lock the seat pan 24 and the seat back 26 with respect to each other so that they form a stretcher that allows a person to lay flat and be transported to another location, such as a hospital.

The seat assembly 14 may also include a headrest 34 that is pivotally connected to the seat back 26 at a pivot point 36. While only one pivot point is shown, it should be understood that multiple pivot points may be utilized. Similar to the locking device 32 that locks the position of the seat pan 24 relative to the seat back 26, the seat assembly 14 may also have a second locking device 38 located between and rotatably coupling the seat back 26 to the headrest 34. Like before, when in an unlocked mode, the second locking device 38 allows for the rotation of the headrest 34 with respect to the seat back 26. However, when in a locked mode, the second locking device 38 locks the headrest 34 in position with respect to the seat back 26.

So, for example, in FIG. 2A, the headrest 34 is in a locked position at a slight angle with respect to the seat back 26. This configuration may be useful when the seat assembly 14 acts as a chair. By having the headrest 34 angled as such with respect to the seat back 26, the headrest 34 can provide some additional comfort to a person seated within the seat assembly 14.

Conversely, as best shown in FIG. 2C, the headrest 34 is shown to be lying flat, along with the seat back 26 and the seat pan 24 so as to allow the seat assembly 14 to act as a stretcher. Like before, the second locking device 38 and the first locking device 32 may be locked so as to prevent the rotation and movement of the seat pan 24, seat back 26, and headrest 34 relative to each other.

The seat assembly 14 may also include one or more extending members that may extend from the seat pan 24, seat back 26 or headrest 34. As best shown in FIG. 2C, extending member 40 may extend or retract as indicated by arrow 42 from the seat pan 24. By so doing, the overall length of the seat assembly 14 when laid flat as a stretcher can be increased thereby providing greater comfort to the person located within the seat assembly 14. Additionally, the headrest 34 may also include an extending member 44 that may extend or retract as shown by arrow 46 from the headrest 34. When extended, the member 44 provides some additional surface area so as to provide greater comfort to the person located within the seat assembly 14 when the seat assembly is folded flat as a stretcher. Additionally, it should be noted that in examples of the seat assembly 14 that do not include the headrest 34, the extending member 44 may extend from the seat back 26 instead of the headrest 34.

Referring back to FIGS. 2A and 2B, the seat back 26 may include one or more support structures 48A and 48B located on generally opposing sides of the seat back 26. The generally opposing structures 48A and 48B essentially help retain and guide the back of a person located within the seat assembly 14. When the seat assembly 14 is laid out as a stretcher, as shown in FIG. 2C, the structural members 48A and 48B may acts as a border so as to prevent the person located within the seat assembly 14 from rolling out of the seat assembly 14 when the seat assembly 14 acts as a stretcher. Additionally, there could be additional features that allow for the stabilization of a person for transport that attached to the seat assembly 14 and a modular manner.

The seat assembly 14 may have one or more handlebars. For example, the seat pan 24 of the seat assembly 14 includes seat pan handlebars 50A and 50B that generally extend from a perimeter 52 of the seat pan 24. The handlebars 50A and 50B are generally located on opposing sides of the seat pan 24 and may also be in line with the support members 48A and 48B. Likewise, the headrest 34 may also have handlebars 54A and 54B from an extending from a perimeter 56 of the headrest 34. Like before, the handlebars 54A and 54B generally oppose one another and may be in line with the structural members 48A and 48B.

In addition to the handlebars described above, the seat assembly 14 may also have handlebars 58A and 58B extending from the perimeter 52 of the seat pan 24 in a direction generally opposite of where the locking device 32 is located. The handlebars 58A and 58B may also be able to rotate on an axis so as to form a footrest, as best shown in FIG. 2C.

The seat assembly 14 may also include one or more restraining devices for assisting with restraining a person to the seat assembly 14. For example, as best shown in FIG. 2A, the seat assembly includes a three-point seatbelt harness having belts 60A and 60B extending from the top of the seat back 26 near the headrest 34. A buckle 60C is attached to the seat pan 24 and is configured to selectively hold in place the seatbelts 60A and 60B so as to restrain a person located within the seat assembly 14. It should be understood that while a three-point safety belt system as utilized in this example, other types of safety belt systems may be utilized. For example, the seat assembly 14 may also have a two-point, three-point, four-point, or five-point safety belt system—either lap and/or should belt—so as to restrain a person to the seat assembly 14. Also, the belts that are part of the safety belt systems may be such that they are capable of retracting.

Additionally or alternatively, the seat assembly 14 may have a supplemental safety belt 62A that extends from a side of the seat back 26 and extend across a width of the seat back 26 so as to retain a person within the seat assembly 14 wrapping around a midsection of a person located within the seat assembly 14. The supplemental seatbelt 62A connects with a buckle 62B so as to lock the supplemental safety belt 62A in place and to restrain a person located within the seat assembly 14. Like before, the supplemental seatbelt 62A may be retractable.

It should be understood that while, in this example, the safety belt systems are shown to be part of the seat assembly 14, it should also be understood that the safety belt systems may, in fact, be separate from the seat assembly 14 and may extend from a support structure that is near the seat assembly 14. As such, the seat assembly 14, in this type of arrangement would need to be situated in a location that has access to the safety belt systems so that the seatbelt systems can properly interact with a person located within the seat assembly 14.

The seat assembly 14 may also have an opening 27 formed within the seat back 26. The opening 27 allows for a person to utilize the seat assembly 14 will also is carrying a backpack. As it is well known in the military, soldiers typically are carrying backpacks in the opening 27 allows for the backpack to fit through the opening 27 so as to allow the back of the person utilizing the seat assembly to be flush with the seat back 26. A flexible or webbing type material 29 may stretch across the opening 27. The material 29 is elastic enough so as to accommodate a backpack that is pressed through the opening 27.

Figure 2D:
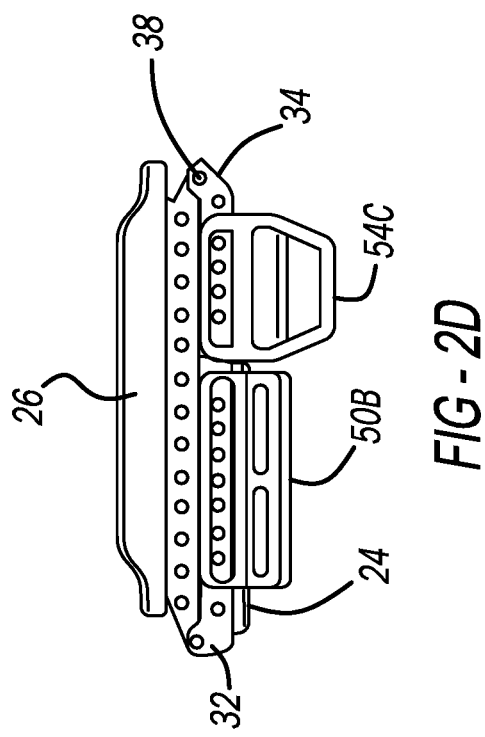

As stated previously, the seat assembly 14 can be converted between a stretcher (as best shown in FIG. 2C) and a chair or seat (as best shown in FIG. 2A). However, in addition to these two modes, the seat assembly 14 can also be folded up in such a way so as to enhance the transportation and/or storage of the seat assembly 14. Referring to FIG. 2D, one such example of the seat assembly 14 converted to an easily transportable and/or storable set up is illustrated. Here, the locking devices 32 and 38 function so as to lock the headrest 34 and the seat pan 24 substantially flush against the back of the seat back 26. The angle of the headrest 34 and/or the seat pan 24 with respect to the seat back 26 may be between and include 0° and 5°.

Figure 3A:
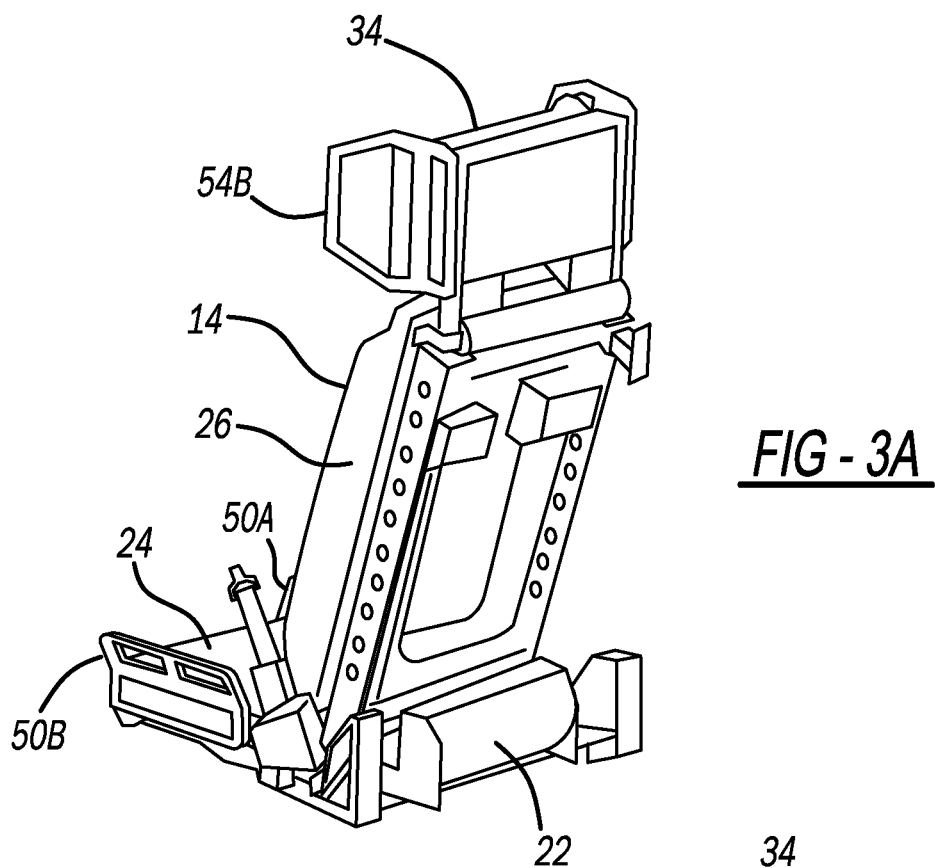
FIGS. 3A and 3B illustrate examples of the seat assembly connected to a rotary energy absorbing device and a more traditional energy absorbing device, respectively.
Figure 3B:
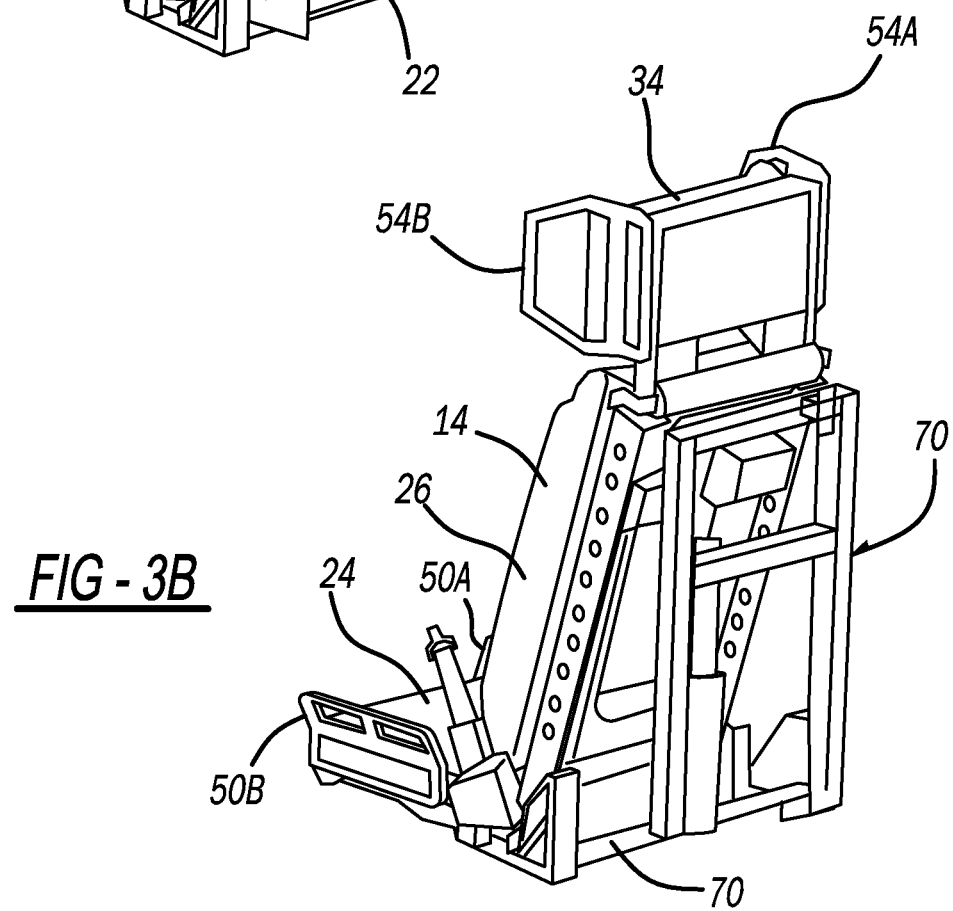

Referring to FIGS. 3A and 3B, the seat assembly 14 is shown attached to an energy attenuating device. In FIG. 3A, the energy and energy attenuating device 22 is a rotary attenuating device as shown and described in U.S. patent application Ser. No. 16/251,518, which. as previously stated, is hereby incorporated in reference in its entirety. FIG. 3B shows a more traditional energy attenuating device 70. The purpose of the energy attenuating devices 22 or 70 is so as to absorb energy generated by an external event, such as an explosion impacting the vehicle to which the seat assembly 14 is located within.

It should be understood that the seat assembly 14 does not necessarily need to be attached to an energy attenuating device 22 or 70 and could be attached to any other external structure, such as a wall or floor. Additionally, it should be understood that the seat assembly 14 is removable from the energy attenuating devices 22 or 70 or any other external structure to which the seat assembly 14 is attached to. Again, sense the seat assembly 14 is removable, it should also be understood that the seat assembly 14 may also be mountable to the energy attenuating devices 22 or 70 or any other external structure to which the seat assembly 14 can be attached to.

Figure 4A:
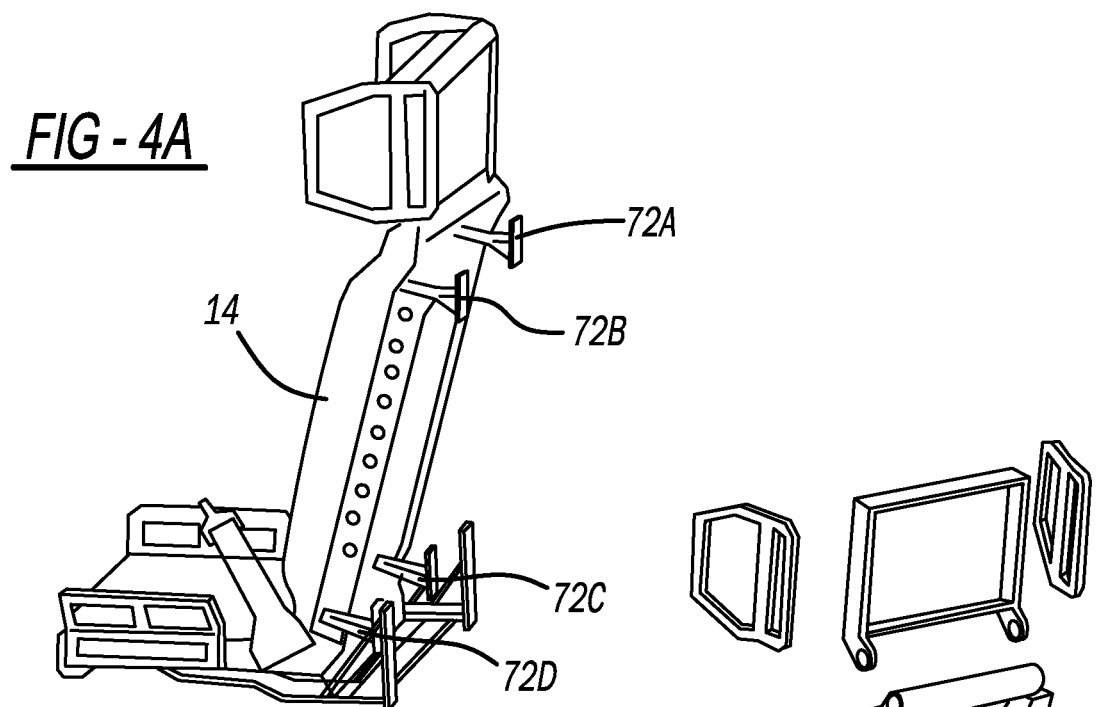
FIGS. 4A, 4B, and 4C illustrate different examples of connecting the seat assembly to a fixed structure.
Figure 4B:
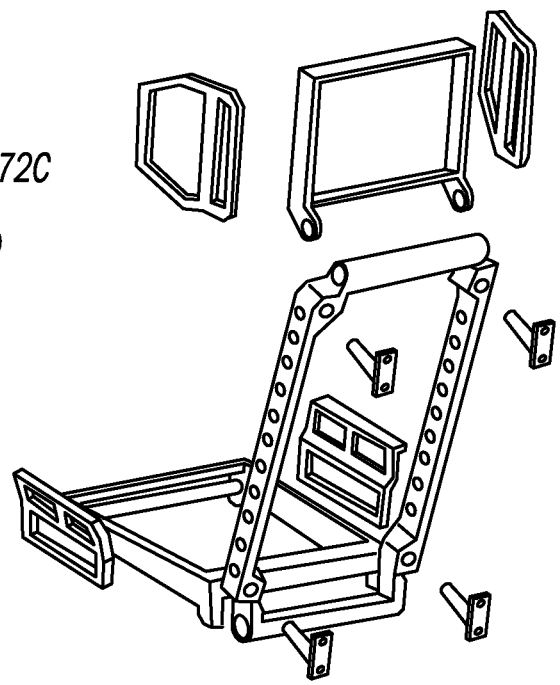
Figure 4C:
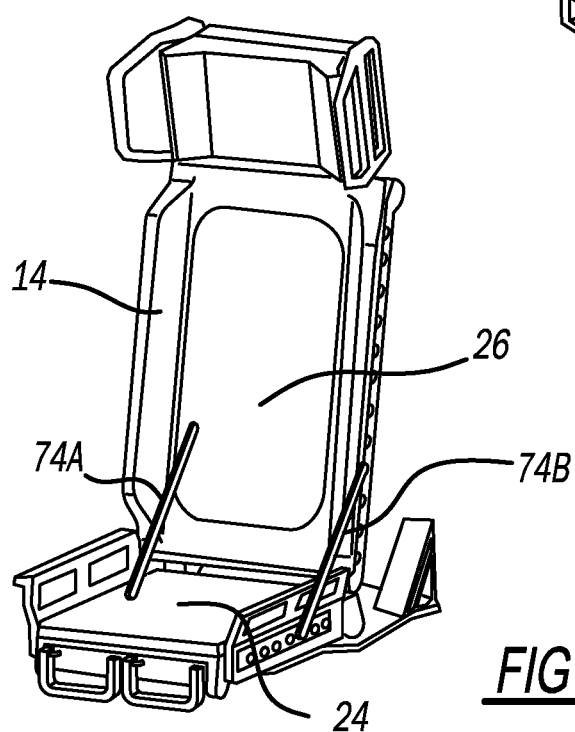

Referring to FIGS. 4A, 4B, and 4C, these figures show different ways the seat assembly 14 can be attached to a support structure, such as a wall or interior structure of a vehicle. Moreover, as best shown in FIGS. 4A and 4B, a plurality of connectors 72A, 72B, 72C, and 72D may be connected to the seat assembly 14 which can then be connected to the external structure. These connectors may connect to either the external structure or the seat assembly 14 for any one of a number of mechanical means of connecting different items to each other. FIG. 4C shows optional triangulation straps 74A and 74B so as to provide some stiffness and rigidity to the seat assembly 14 especially with regards to the position of the seat pan 24 relative to the seat back 26.

Figure 5C:
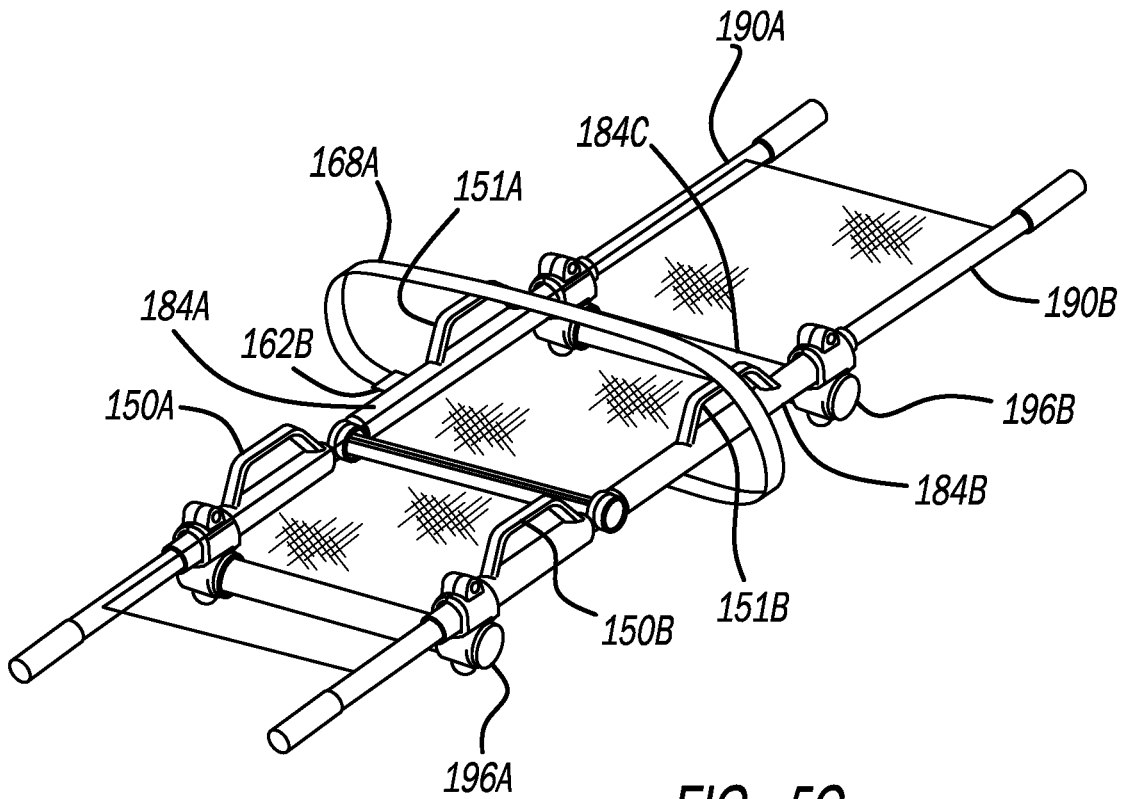

Referring to FIGS. 5A, 5B, and 5C, another example of the seat assembly 114 is shown. For the sake of simplicity, like reference numerals will be utilized to refer to like elements with the difference that the reference numerals have been increased by 100. So, for example, the seat assembly 14 described in FIGS. 2A, 2B, and 2C is somewhat similar to the seat assembly 114 shown and described in FIGS. 5A, 5B, and 5C.

In this example, the seat assembly 114 has, like before, a seat pan 124 and a seat back 126. Additionally, the seat assembly 114 may also include a headrest 134. Like before, the seat pan 124 and the seat back 126 are pivotally connected to each other along a central pivot 128 and further include a locking device 133 so as to selectively lock the position of the seat pan 124 relative to the seat back 126 along the central pivot 128. While only one pivot point is shown, it should be understood that multiple pivot points may be utilized. Additionally, the headrest 134 is pivotally attached to the seat back 126 along a pivot 136. A locking device 138 functions to selectively lock the position of the headrest 134 with respect to the seat back 126.

The seat pan 124 may include two substantially parallel longitudinal members 180A and 180B. The longitudinal members are connected to one another using lateral members 180C and 180D. A webbing or flexible material 182 may be connected to at least two of the members 180A, 180B, and 180C so as to support the lower portion of a person utilizing the seat assembly 114.

The seat back 126 may include longitudinal members 184A and 184D that are connected to each other via the member 180C as well as the member 184C. Like before, a flexible material or webbing 186 may be connected to at least two of the members 180C, 184A, 184B, and 184C so as to support the back of a person utilizing the seat assembly 114.

The seat assembly 114 may further include two telescoping arms 190A and 190B that may extend from the members 184A and 184B, respectively. A webbing or flexible material 192 may be connected to the arms 190A and 190B so as to support the head of a person utilizing the seat assembly 114. Alternatively, the telescopic arms 190A and 190B may be fixed in position and may not telescope.

Telescopic arms 194A and 194B may also extend from the members 180A and 180B, respectively so as to form handles making it easier to carry a person when the seat assembly is functioning as a stretcher. Moreover, as best shown in FIG. 5C, the seat assembly 114 is being utilized as a stretcher wherein the telescopic arms 190A, 190B, 194A, and 194B essentially act as handles allowing two persons to readily transport a person lying on the seat assembly 114. Additionally, the seat assembly 114 may include crossbar supports 196A and 196B located adjacent to the seat back 126 and/or the seat pan 124. The crossbar supports 196A and 196B essentially provide support and ground feet for when it is necessary to lay a person on a flat surface when the seat assembly 114 is configured as a stretcher.

It should be understood that the seat assembly 114 could also include any one of a number of different safety belt systems as previously described. As such, the seat assembly 114 could include a two-point, three-point, or five-point safety belt system. As best shown in FIG. 5B, a safety belt 162A is shown that is capable of stretching across the seat back 126 and to engage a buckle 162B so as to restrain a person within the seat assembly 114. This may be especially advantageous when the seat assembly 114 is configured as a stretcher.

The seat assembly 114, like the previously described seat assembly 14, may also include one or more handlebars 150A, 150B extending from the members 180A and 180B, respectively. Additionally, handlebars 151A and 152A may extend from members 184A and 184B, respectively.

Figure 5D:
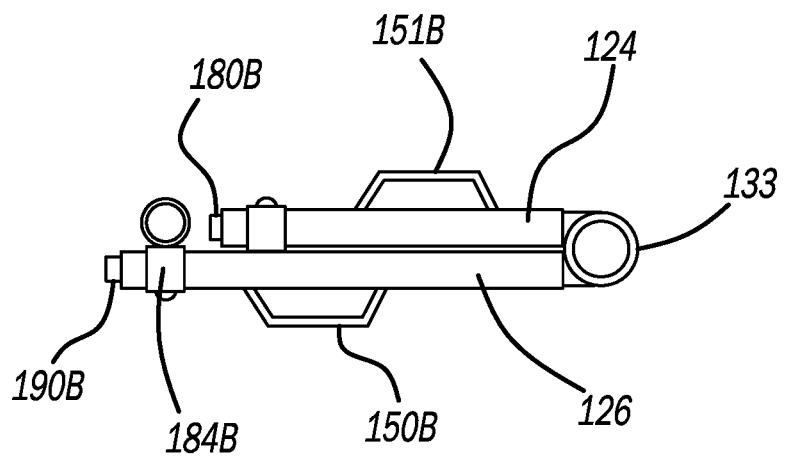

Like the other example, the seat assembly 114 can be folded up into an easily transportable or storable set up. Referring to FIG. 5D, one such example ofs the seat assembly 114 converted to an easily transportable and/or storable set up is illustrated. Here, the locking device 132 functions so as to lock the seat pan 124 flush against the back of the seat back 126. The angle of the the seat pan 124 with respect to the seat back 126 may be between and include 0° and 5°.

Figure 6A:
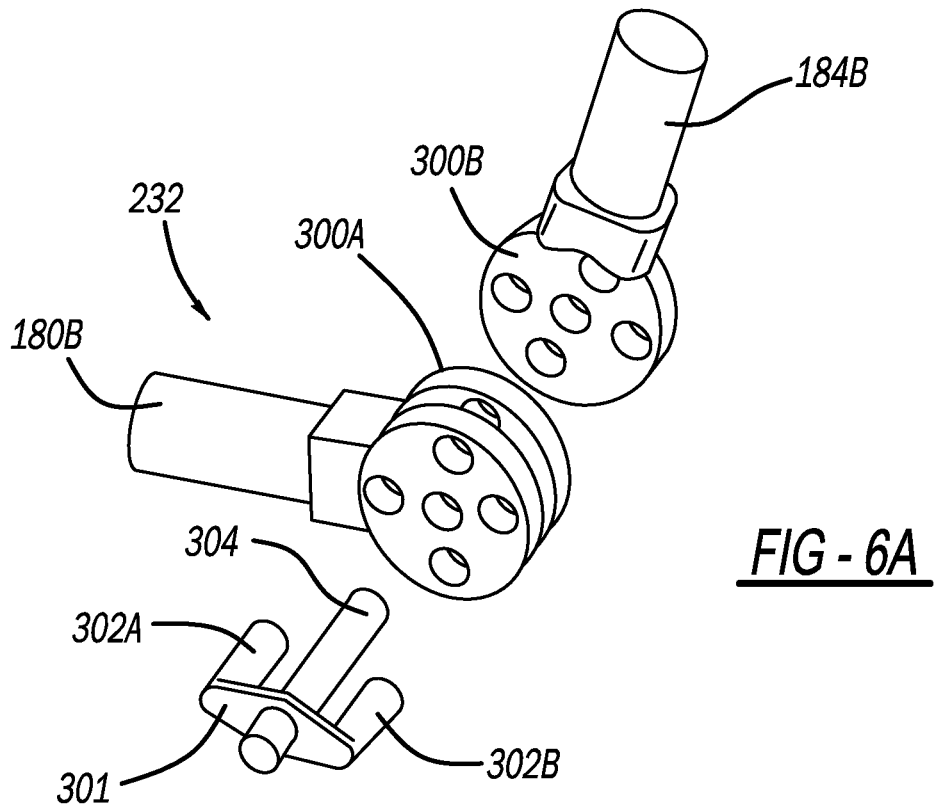

As previously stated, the locking devices 32, 38, 132, and/or 138 may utilize any one of a number of different methodologies so as to lock the seat pans 24 or 124 with respect to the seat backs 26 or 126 or to lock the seat backs 26 or 126 with respect to the headrests 34 or 134. Referring to FIG. 6A one such example is shown. In this example, the locking member 232 may include a ladder hinge style locking member with a locking pin 301. Here, ladder hinges 300A and 300B mate with each other. The pin 301 is configured so as to lock the ladder hinges 300A and 300B in position with one another. Moreover, the pin 301 has pins 302A and 302B that extend through holes found in both the hinges 300A and 300B. When the pins 302A and 302B extend through the holes found in the hinges 300A and 300B, the members 180B and 184B are locked in position relative to each other. The pin 301 may also have a central extension 302C that extends through the middle of the ladder hinges 300A and 300A so as to provide a center pivot of rotation. Like before, while only one pivot point is shown, it should be understood that multiple pivot points may be utilized.

Figure 6B:
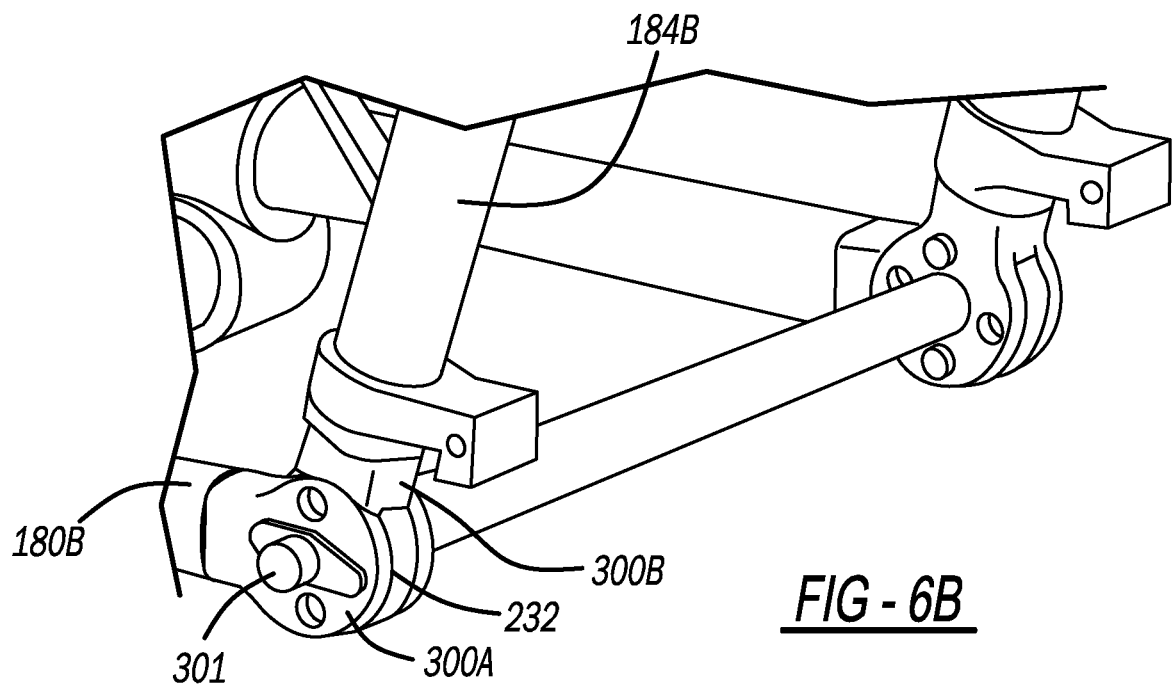
Figure 6F:
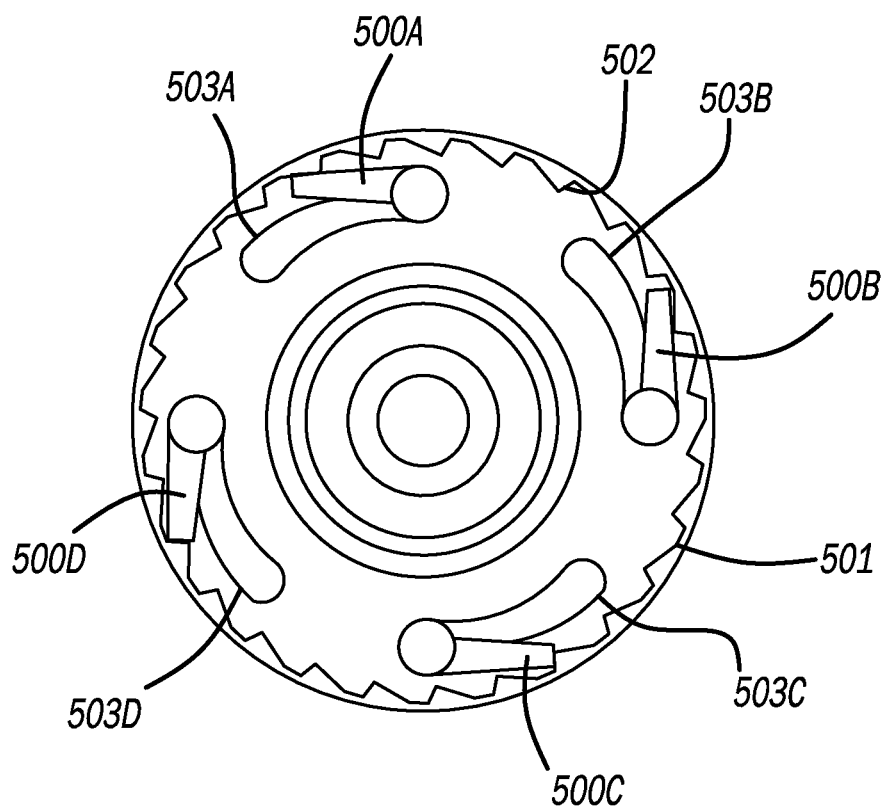

FIG. 6B shows yet another example of the locking device. In this example, the locking device includes two handles 400A and 400B that have an interconnecting member 400C. Locking discs 401A and 401B are in mechanical communication with the handle 400A while locking discs 401C and 401D are in mechanical communication with the handle 400B. When the locking this 401A and 401B are pressed together using the handle 400A the locking discs essentially lock into place preventing the movement of members they are connected to. The same is true on the opposite side when locking this 401C and 401D are pressed together using the handle 400B.

Referring to FIGS. 6C-6F, yet another example of the locking device is shown. This type of locking device has one or more pawls 500A, 500B, 500C and 500D that interact with the plurality of teeth 501 located within a housing 502. One or more springs 503A, 503B, 503C, and 503D, interact with the pawls 500A, 500B, 500C, and 500D, respectively. The springs 503A, 503B, 503C, and 503D essentially bias the pawls 500A, 500B, 500C and 500D towards the locking teeth 501. When a button 504 is pressed, the pawls 500A, 500B, 500C, and 500D are pushed against the biasing force of the springs 503A, 503B, 503C and 503D and therefore allow the free movement of the members 184A and 184B. When the button 504 is no longer pressed, the springs 503A, 503B, 503C, and 503D bias the pawls 500A, 500B, 500C and 500D towards the locking teeth 501, locking the members 184A and 1846 into place.

As any person skilled in the art will readily appreciate, the above description is meant as an illustration of an implementation of the principles of this invention. This description is not intended to limit the scope or application of this invention in that the invention is susceptible to modification, variation, and change, without departing from the spirit of this invention, as defined in the following claims.

The invention claimed is:

1. A removable or mountable seat assembly, comprising:
a seat back;
a seat pan; and
a locking device in mechanical communication with the seat back and the seat pan and pivotally connecting the seat back to the seat pan via at least one pivot point, wherein the locking device has a locked mode and an unlocked mode,
wherein, when the locking device is in the locked mode, the seat back and seat pan are locked into position relative to one another along at least one common axis of rotation,
wherein, when the locking device is in the unlocked mode, the seat back or the seat pan is unlocked and is able to move freely along the at least one common axis of rotation,
wherein the removable or mountable seat assembly is configured to be removable or mountable from or to a support structure,
wherein the seat back and the seat pan substantially lie along a common plane to form a stretcher and are locked into position relative to one another along the at least one common axis of rotation,
wherein the seat pan is rotated in a forward direction with respect to the seat pan along the at least one common axis of rotation defined as a first angle such that the seat back and the seat pan are at the first angle from one another forming a seat, and
wherein the seat pan is rotated in a backward direction to be folded in a second angle which is reversed from the first angle along the at least one common axis of rotation such that a back surface of the seat pan is substantially flush with a back surface of the seat back in a folded state.

2. A removable or mountable seat assembly, comprising:
a seat back;
a seat pan; and
a locking device in mechanical communication with the seat back and the seat pan and pivotally connecting the seat back to the seat pan via at least one pivot point, wherein the locking device has a locked mode and an unlocked mode,
wherein, when the locking device is in the locked mode, the seat back and seat pan are locked into position relative to one another along at least one common axis of rotation,
wherein, when the locking device is in the unlocked mode, the seat back or the seat pan is unlocked and is able to move freely along the at least one common axis of rotation,
wherein the removable or mountable seat assembly is configured to be removable or mountable from or to a support structure,
wherein the seat back and the seat pan are configured to rotate along the at least one common axis of rotation such that the seat pan and the seat back are able to substantially lie along a common plane to form a stretcher, and the locking device is configured to selectively lock the seat pan and the seat back such that the seat back and the seat pan lie along the common plane forming the stretcher and are locked into position relative to one another along the at least one common axis of rotation,
wherein the seat back and the seat pan are configured to rotate along the at least one common axis of rotation such that the seat pan and the seat back are at a first angle from one another forming a seat, and the locking device is configured to selectively lock the seat pan and the seat back such that the seat back and the seat pan are at the first angle from one another forming the seat and are locked into position relative to one another along the at least one common axis of rotation,
wherein the seat back and the seat pan are configured to rotate along the at least one common axis of rotation such that the seat pan and the seat back are at a second angle from one another forming a folded seat which is reversed from the first angle, and the locking device is configured to selectively lock the seat pan and the seat back such that the seat back and the seat pan are at the second angle from one another forming the folded seat and are locked into position relative to one another along the at least one common axis of rotation, and
wherein the seat pan is rotated in a backward direction to be folded with the second angle such that a back side of the seat pan and a back side of the seat back are faced to each other at the second angle forming the folded seat.

3. The seat assembly of claim 2, wherein the first angle between the seat pan and the seat back is approximately between 85° and 130° so as to form a chair.

4. The seat assembly of claim 2, wherein the second angle is between and including 0° and 30°.

5. The seat assembly of claim 2, wherein the seat pan further comprises an extendable member, the extendable member being configured to extend from the seat pan in a direction opposite from the seat back.

6. The seat assembly of claim 2, wherein the seat pan further comprises at least one handle located adjacent to a perimeter of the seat pan.

7. The seat assembly of claim 2, wherein the seat back further comprises at least one interlocking handle located adjacent to a perimeter of the seat back.

8. The seat assembly of claim 2, further comprising a headrest located adjacent to the seat back, opposite of the seat pan.

9. The seat assembly of claim 8, wherein the headrest is rotatably connected to the seat back and rotates about a second axis of rotation via at least one pivot.

10. The seat assembly of claim 9, further comprising a second locking device, the second locking device configured to lock the headrest along relative to the seat back along the second axis of rotation.

11. The seat assembly of claim 9, further comprising a headrest extension member configured to extend from the headrest opposite of the seat back.

12. The seat assembly of claim 9, further comprising at least one handle located adjacent to a perimeter of the headrest.

13. The seat assembly of claim 2, wherein the support structure is a wall.

14. The seat assembly of claim 2, wherein the support structure is an energy attenuating device.

15. The seat assembly of claim 14, wherein the energy attenuating device is a rotary energy attenuating device.

16. The seat assembly of claim 2, wherein the seat back further comprises spaced apart seat back longitudinal members, each of the seat back longitudinal member having a length and opposed first and second ends, and upper and lower transverse members extending between to a first end and a second end of the longitudinal members, respectively.

17. The seat assembly of claim 2, wherein the seat pan further comprises opposed, spaced apart seat pan longitudinal members, each of the seat pan longitudinal members having a length and opposed first and second ends, and a transverse member extending between to the first end of the seat pan longitudinal members.

18. The seat assembly of claim 2, further comprising a safety belt configured to retain a person within the seat assembly.

19. The seat assembly of claim 18, wherein the safety belt is one of a two-point belt restraining system, a three-point belt restraining system, a four-point belt restraining system or a five-point belt restraining system.

20. The seat assembly of claim 18, wherein the safety belt is a supplemental safety belt that is configured to extend across a width of the seat back so as to retain a person within the seat assembly.

21. The seat assembly of claim 2, wherein at least one of the seat back and the seat pan is a molded structure.

* * * * *